(12) United States Patent
Stachowiak, Jr. et al.

(10) Patent No.: US 12,146,386 B2
(45) Date of Patent: Nov. 19, 2024

(54) VALVE ASSEMBLY FOR DOWNHOLE PUMP OF RECIPROCATING PUMP SYSTEM

(71) Applicant: Weatherford Technology Holdings, LLC, Houston, TX (US)

(72) Inventors: John E. Stachowiak, Jr., Houston, TX (US); Justin R. Galle, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 75 days.

(21) Appl. No.: 17/563,303

(22) Filed: Dec. 28, 2021

(65) Prior Publication Data

US 2023/0203913 A1 Jun. 29, 2023

(51) Int. Cl.
*E21B 34/08* (2006.01)
*F16K 15/04* (2006.01)
*F16K 27/02* (2006.01)

(52) U.S. Cl.
CPC .............. *E21B 34/08* (2013.01); *F16K 15/04* (2013.01); *F16K 27/0245* (2013.01); *E21B 2200/04* (2020.05)

(58) Field of Classification Search
CPC .. E21B 34/08; E21B 34/142; F16K 2200/502; F16K 15/04; Y10T 137/791; F04B 53/1007
See application file for complete search history.

(56) References Cited

U.S. PATENT DOCUMENTS

| | | |
|---|---|---|
| 751,758 A | 2/1904 | Small |
| 2,061,480 A | 11/1936 | Pigott |
| 2,274,968 A | 3/1942 | O'Bannon |
| 2,294,568 A | 9/1942 | Neilsen |
| 2,898,128 A | 8/1959 | Shohan |
| 3,593,343 A | 7/1971 | Viggers |

(Continued)

FOREIGN PATENT DOCUMENTS

| | | |
|---|---|---|
| RU | 2382926 C2 | 11/2007 |
| RU | 112293 U1 | 6/2011 |

OTHER PUBLICATIONS

Don-Nam, "Insert Guided Cage," Brochure, undated, obtained from www.dan-nan.com on Apr. 24, 2018, 1-pg.

(Continued)

*Primary Examiner* — Kenneth Rinehart
*Assistant Examiner* — Nicole Gardner
(74) *Attorney, Agent, or Firm* — Cabello Hall Zinda, PLLC (57) ABSTRACT

A downhole pump used for a reciprocating pump includes a barrel and a plunger. The barrel couples to a tubing string and has a standing valve. The plunger couples to a rod string and has a traveling valve. One or both of the valves can include an assembly comprising a housing and an insert. The insert allowing for flow therethrough has a ball stop and a ball passage. Positioned in the housing, one end of the insert engages a tapered sidewall in the housing. The insert is secured with metallic material metallurgically affixed between the insert and the housing. For example, brazing material can be brazed at the end of the insert to metallurgically affix the insert in the passage. A ball is positioned in the insert, and a seat is positioned adjacent an end of the insert. The assembly is then incorporated into components of the pump.

25 Claims, 8 Drawing Sheets

(56) References Cited

U.S. PATENT DOCUMENTS

| | | |
|---|---|---|
| 3,724,496 A | 4/1973 | Secrist |
| 3,776,258 A | 12/1973 | Dockins, Jr. |
| 3,990,472 A | 11/1976 | Etes |
| 4,361,420 A | 11/1982 | Bell |
| 4,685,517 A | 8/1987 | Baggett |
| 5,195,552 A | 3/1993 | Nehm |
| 5,507,312 A | 4/1996 | Dillman |
| 5,593,289 A | 1/1997 | Tarpley |
| 5,593,292 A | 1/1997 | Ivey |
| 6,007,314 A | 12/1999 | Nelson, II |
| 6,029,685 A | 2/2000 | Carruth |
| 6,199,636 B1 | 3/2001 | Harrison |
| 6,283,148 B1 | 9/2001 | Spears et al. |
| 6,685,451 B1 | 2/2004 | Ivey |
| 7,069,997 B2 | 7/2006 | Coyes et al. |
| 8,453,673 B2 | 6/2013 | Ford |
| 10,100,609 B2 | 10/2018 | Ford |
| 10,184,314 B1 | 1/2019 | Bair et al. |
| 10,767,445 B2 | 9/2020 | Stachowiak, Jr. et al. |
| 11,091,980 B2 | 8/2021 | Stachowiak, Jr. |
| 11,125,349 B1 | 9/2021 | Samayamantula |
| 2009/0223574 A1 | 9/2009 | Montague |
| 2010/0269928 A1 | 10/2010 | Ford |
| 2019/0353003 A1 | 11/2019 | Stachowiak, Jr. et al. |
| 2021/0246992 A1 | 8/2021 | Ford |
| 2021/0270381 A1* | 9/2021 | Samayamantula ......................... F16K 27/0245 |
| 2021/0301621 A1 | 9/2021 | Pola et al. |

OTHER PUBLICATIONS

Schlumberger, "Insert Guided Cage," Brochure, copyright 2018, 1-pg.

Int'l Search Report and Written Opinion in counterpart PCT Appl. PCT/US2022/048308, mailed Feb. 23, 2023, 9-pgs.

* cited by examiner

VALVE ASSEMBLY FOR DOWNHOLE PUMP OF RECIPROCATING PUMP SYSTEM

BACKGROUND OF THE DISCLOSURE

Reciprocating pump systems, such as sucker rod pump systems, extract fluids from a well and employ a downhole pump connected to a driving source at the surface. A rod string connects the surface driving force to the downhole pump in the well. When operated, the driving source cyclically raises and lowers the downhole plunger, and with each stroke, the downhole pump lifts well fluids toward the surface.

Figure 1:
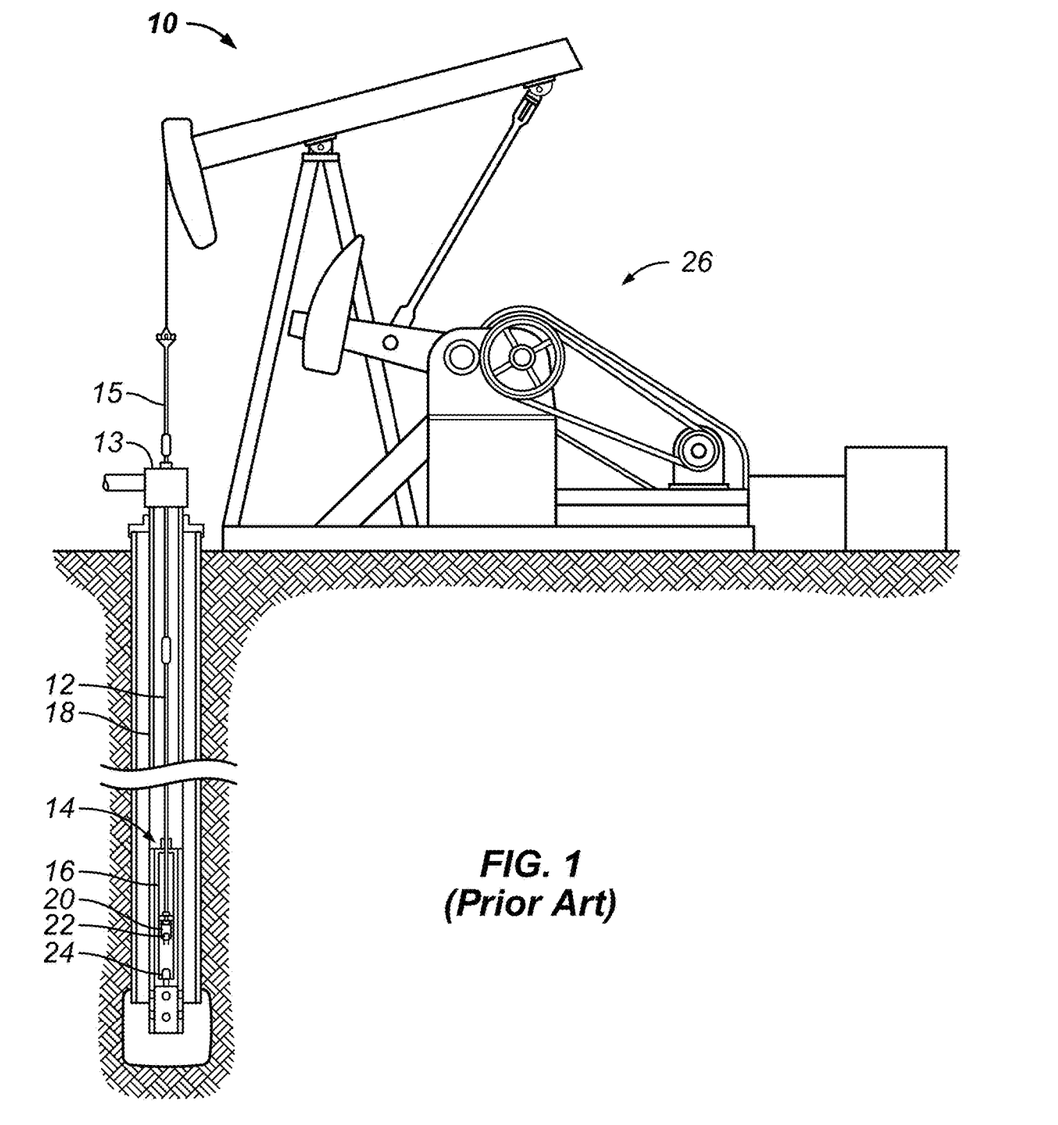
FIG. 1 illustrates an example of a reciprocating rod pump system known in the art.

For example, FIG. 1 shows a sucker rod pump system 10 used to produce fluid from a well. A downhole pump 14 has a barrel 16 with a standing valve 24 located at the bottom. The standing valve 24 allows fluid to enter from the wellbore, but does not allow the fluid to leave. Inside the pump barrel 16, a plunger 20 has a traveling valve 22, which allows fluid to move from below the plunger 20 to the production tubing 18 above, but does not allow fluid to return from the tubing 18 to the pump barrel 16 below the plunger 20. A driving source (e.g., a pump jack or pumping unit 26) at the surface connects by a rod string 12 to the plunger 20 and moves the plunger 20 up and down cyclically in upstrokes and downstrokes to lift fluid to the surface.

Various types of valve assemblies have been used for the standing and traveling valves of a downhole pump. Operators are interested in valve assemblies that are robust and can facilitate operations of the plunger in the downhole environment.

The subject matter of the present disclosure is directed to overcoming, or at least reducing the effects of, one or more of the problems set forth above.

SUMMARY OF THE DISCLOSURE

A method is disclosed herein of assembling a valve assembly of a downhole pump for a reciprocating pump system. In the method, an insert is inserted in a flow passage of a housing. The housing has first and second ends, and the flow passage defines a longitudinal sidewall transitioned to a tapered sidewall. The longitudinal sidewall is disposed between the first and second ends. The tapered sidewall is disposed between the longitudinal sidewall and the first end, and the tapered sidewall tapers inward from the longitudinal sidewall. The insert has third and fourth ends allowing for flow therethrough. The third end has a tapered surface and defines a ball stop. The fourth end has a longitudinal surface and defines a ball passage. The tapered surface of the insert engages against the tapered sidewall of the flow passage, and the longitudinal surface of the insert floats unshouldered adjacent the longitudinal sidewall. The insert secures in the housing by applying heat, brazing a brazing material between the longitudinal surface of the insert and the longitudinal sidewall of the flow passage in response to the applied heat, and increasing the engagement of the tapered surface of the insert against the tapered sidewall of the flow passage using thermal expansion from the applied heat followed by thermal compression from subsequent cooling.

A downhole pump for a reciprocating pump system having a rod string disposed in a tubing string disclosed herein can comprise a valve assembly assembled according to the method described above.

A valve assembly is disclosed herein for a downhole pump. The valve assembly comprises a housing, an insert, a seat, and a ball. The housing is configured to connect on the pump. The housing has first and second ends and defines a flow passage therethrough. The flow passage defines a longitudinal sidewall and a tapered sidewall. The longitudinal sidewall is disposed between the first and second ends. The tapered sidewall is disposed between the longitudinal sidewall and first end, and the tapered sidewall tapers inward from the longitudinal sidewall.

The insert is disposed in the flow passage of the housing. The insert has third and fourth ends allowing for flow therethrough. The third end has a tapered surface and defines a ball stop, while the fourth end has a longitudinal surface and defines a ball passage. The tapered surface of the insert and the tapered sidewall of the flow passage has a loaded engagement against one another, the longitudinal surface floated unshouldered adjacent the longitudinal sidewall of the flow passage. The seat is disposed in the flow passage of the housing adjacent the fourth end of the insert. The ball is disposed in the flow passage and is trapped between the ball stop and the seat.

A valve assembly is disclosed herein for a downhole pump. The assembly comprises a housing and an insert. The housing is configured to connect on the pump. The housing has first and second ends and defines a flow passage therethrough. The flow passage defines a longitudinal sidewall and a tapered sidewall. The longitudinal sidewall is disposed between the first and second ends. The tapered sidewall is disposed between the longitudinal sidewall and first end, and the tapered sidewall tapers inward from the longitudinal sidewall. The insert is disposed in the housing. The insert has third and fourth ends allowing for flow therethrough. The third end has a tapered surface and defines a ball stop. The fourth end has a longitudinal surface and defines a ball passage. The tapered sidewall of the flow passage is shrunk fit against the tapered surface. The longitudinal surface is floated unshouldered adjacent the longitudinal sidewall and is secured thereto with a metallurgical securement.

The foregoing summary is not intended to summarize each potential embodiment or every aspect of the present disclosure.

DETAILED DESCRIPTION OF THE DISCLOSURE

Figures 2, 3A, 3B:
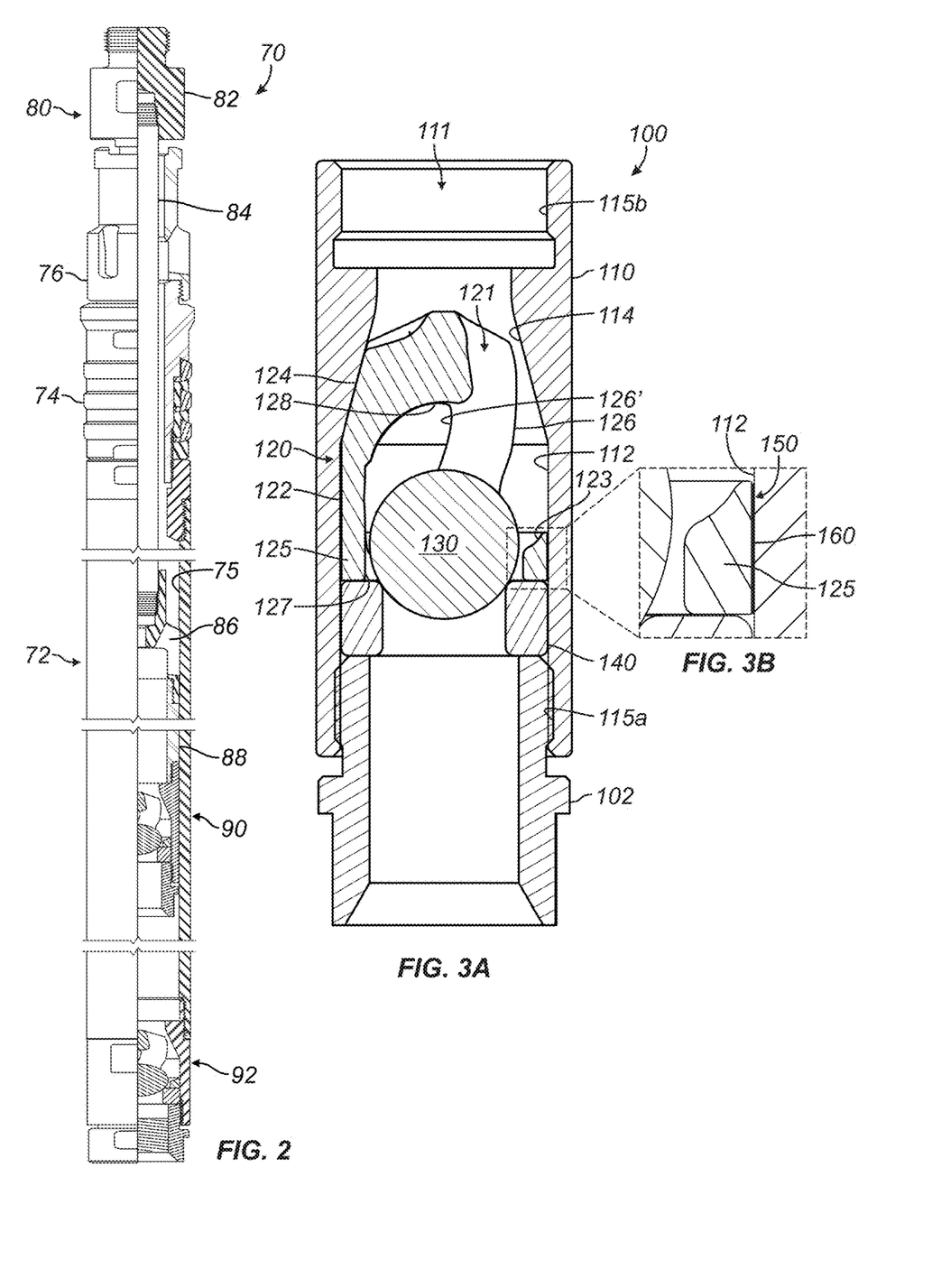
FIG. 2 illustrates a downhole pump of a reciprocating pump system according to the presented disclosure.
FIG. 3A illustrates a cross-sectional view of a valve assembly for the downhole pump of FIG. 2.
FIG. 3B illustrates a detail of FIG. 3A.

FIG. 2 illustrates a downhole pump 70 of a reciprocating pump system according to the presented disclosure. The downhole pump 70 has a stationary assembly having a barrel 72 connected to a seating assembly 74 and a top outlet 76. Various types of seating assemblies 74 can be used, and the one shown is only provided as an example. A standing valve assembly 92 is located at the bottom of the barrel 72. The standing valve assembly 92, which includes a cage insert, a ball, and a seat, allows fluid to enter the barrel 72 from a wellbore, but does not allow the fluid to leave.

A traveling assembly 80 connects at a coupling 82 to a rod string (not shown) used for reciprocating the traveling assembly 80. A rod 84 extends from the coupling 82 to a ported coupling 86 connected to a plunger 88, which is movably disposed in the barrel's internal chamber 75. The plunger 88 has a traveling valve assembly 90, which includes a cage insert, a ball, and a seat. The traveling valve assembly 90 allows fluid to enter from below the plunger 88, but does not allow fluid to leave.

As will be appreciated, the lengths of the barrel 72, rod 84, plunger 88 and the like are not shown to relative scale in FIG. 2 representative of the stroke of the pump 70. In any event, during the upstroke, the traveling valve assembly 90 is closed, and any fluid above the plunger 88 is lifted towards the outlet 76. Meanwhile, the standing valve assembly 92 opens and allows fluid to enter the pump barrel 72 from the wellbore. During the downstroke, the traveling valve assembly 90 is opened, and the standing valve assembly 92 closes. Previously drawn fluid in the barrel 72 can then enter through the traveling valve 90 to above the plunger 88.

The traveling valve assembly 90 and/or the standing valve assembly 92 use a valve assembly according to the present disclosure. Several configurations for the valve assemblies are disclosed below.

Turning to FIG. 3A, a cross-sectional view of a valve assembly 100 for the downhole pump of FIG. 2 is shown. The valve assembly 100 includes a housing 110, a cage insert 120, a ball 130, and a seat 140. The housing 110 has first and second ends 115a-b and defines a flow passage 111 therethrough. Internally, the flow passage 111 defines a longitudinal sidewall 112 between the ends 115a-b and defines a tapered sidewall 114 between the longitudinal sidewall 112 and second (upper) end 115b. The longitudinal sidewall 112 makes a cylindrical portion of the flow passage 111, and the tapered sidewall 114 tapers inward to create a nozzle or funnel restriction in the flow passage 111. As is typical, the ends 115a-b have threads for threading to other components of a pump. As shown here, the ends 115a-b include box threads, but either one or both could be pin threads depending on the location of the valve assembly on a pump.

The cage insert 120 has a flow passage 121 allowing for flow therethrough. The upper end of the flow passage 121 defines a ball stop 128, and the lower end of the flow passage 121 defines a ball passage 127. Axial rails 126 divided by flutes 126' connect between a ring structure or portion 125 and the stop 128 of the insert 120. The rails 126 support the axial movement of the ball 130 inside the flow passage 121, while the flutes 126' allow for flow to pass around the ball 130. The insert 120 can be a unitary piece as shown or can comprise more than one piece in an assembly.

The insert 120 includes a longitudinal external surface 122 toward the insert's downhole end extending outside the ring structure 125 and extending up a portion of the rails 126. Meanwhile, the insert 120 includes a tapered external surface 124 toward the insert's uphole end extending on a remaining portion of the rails 126 as they come together to form the ball stop 128.

The tapered surface 124 engages the tapered sidewall 114 inside the housing 110. Meanwhile, the insert's longitudinal surface 122 at the insert's downhole end is floated or placed unshouldered adjacent the longitudinal sidewall 112 of the housing's flow passage 111. Therefore, the longitudinal surface 122 of the insert 120 as well as any other portion (except for the tapered surface 124) do not engage or shoulder against a shoulder or other interrupting feature inside the housing's flow passage 111. Further details related to this are provided below.

The seat 140 is inserted adjacent the lower ring structure 125 of the insert 120 and is held in place by an adapter or an endpiece 102 of the housing 110 that is threaded to the thread of the downhole end 115a of the housing 110. The ball 130 is movable in the insert 120 and is trapped to engage the stop 128, pass through the ball passage 127, or engage against the seat 140.

The insert 120 and the housing's flow passage 111 form a nozzle-like or funnel-like configuration that can increase the flow coefficient through the assembly 100 and can reduce fluid drag when the ball 130 is stopped against the ball stop 128. In the end, the tapered surface 124 and sidewall 114 provide a smooth transition of fluid flow past the stopped ball 130, both around the ball 130 and downstream of the ball 130. In this way, the exit geometry can reduce issues with ball chatter, cage insert wear, and potential gas breakout. Additionally, a flare 123 from the ball passage 127 to the flutes 126' can act like a variable orifice that helps to reduce ball chatter.

In a first configuration, the insert 120 is secured in the housing's flow passage 111 by being retained through the uphole engagement of the tapered surface 124 against the tapered sidewall 114 and by being retained through orthogonal downhole shouldering of the end face of the ring structure 125 against the installed ball seat 140.

In this first configuration as shown in the detail of FIG. 3B, a structure 160 for sealing an annular space between the insert's longitudinal surface 122 and the flow passage's longitudinal sidewall 112 can be used. The sealing provided by the structure 150 can prevent flow from washing out the threads on the end 115a of the housing 110 over time during operations. The structure 150 can be composed of conventional sealing material, such as an elastomer.

In a second configuration, the insert 120 is secured in the housing's flow passage 111 by being retained through the uphole engagement of the tapered surface 124 against the tapered sidewall 114 and through a metallurgical securement 160 between the insert's longitudinal surface 122 and the flow passage's longitudinal sidewall 112. As schematically shown in FIG. 3B, for example, the metallurgical securement 150 can include a brazing material or a soldering material for securing the insert's longitudinal surface 122 to the flow passage's longitudinal sidewall 112. The securement 160 can also provide sealing of the annular space between the insert's longitudinal surface 122 and the flow passage's longitudinal sidewall 112, which can prevent flow from washing out the threads on the end 115a of the housing 110 over time during operations. Of course, additional configurations can include a combination of both elastomeric sealing structures 150 and metallurgical securement 160.

According to one particular embodiment, the insert 120 secures in the housing's flow passage 111 with the metallurgical securement 160 having a brazing material metallurgically affixed between the housing's longitudinal sidewall 112 and the longitudinal surface 122 of the insert 120. As shown here, the brazing material securement 160 metallurgically affixes the lower end of the insert 120 to the flow passage 111. This securing produces a seal that helps prevent fluid leakage from passing in the annulus between the insert 120 and the flow passage 111, which could leak past the seat 140 and potentially erode the thread at the connection of the housing's end 115a to the adapter 102.

The metallurgical securement 160 can be comprised of a number of materials that metallurgically affixes between a portion of the insert 120 and the flow passage 112 using a brazing or a soldering process. Further details are disclosed below.

Once assembled, the affixing provided by the metallurgical securement 160 and the engagement provided by the tapered surface and sidewall 112, 114 can secure the insert 120 in the flow passage 111. This securement of the insert 120 in the flow passage 112 can be with a compressive load being present on the insert 120. Alternatively, this securement can be without (or with at least reduced) compressive load across the insert's ends should compressive load on the insert 120 be expected to distort its shape or lead to premature failure.

For this configuration, the uphole tapered engagement of the tapered surface 124 against the tapered sidewall 114 and the metallurgical securement 160 retain the insert 120 in the flow passage 111. Thus, the insert 120 is not retained by an orthogonal or square shouldering of a portion of the insert 120 with a portion of the housing's flow passage 111.

FIGS. 4A-4D illustrate different views of an insert 120 for the disclosed valve assembly. As shown, the insert 120 has a ring portion 125 that defines the ball passage 127 of the insert 120. This ball passage 127 has a diameter at least as great as the diameter of the floating check ball (130) to allow the ball to pass. The rails or ribs 126 extend up from the ring portion 125 and meet together in a center of the flow passage 121 to form the ball stop 128. Preferably, the ball stop 128 defines a partially spherical surface suited for snuggly engaging the ball (130). Three rails 126 are shown, but more or less could be used.

Figure 4A:
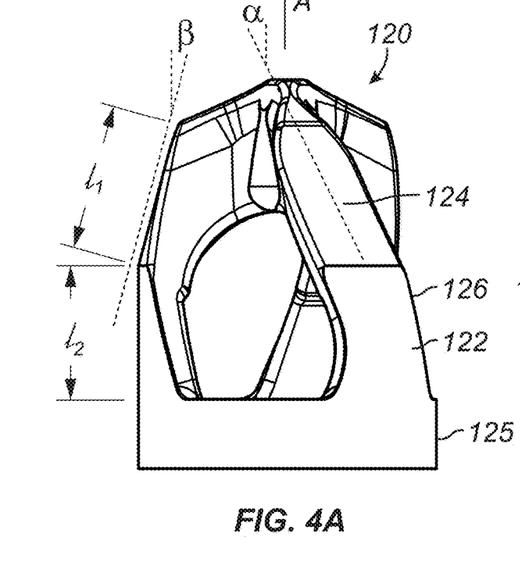
FIGS. 4A-4D illustrate different views of an insert for the disclosed valve assembly.

The rails or ribs 126 of the insert 120 are helical, angled, skewed, spiraled, or the like at an angle ($\alpha$) as shown in FIG. 4A, which can induce rotational flow in the fluid moved through the insert's flow passage 121. The helical rails 126 also help to stabilize the passage of the ball (130) in the passage 121 while the flutes 126' between the rails 126 all for fluid flow around the ball (130), such as when engaged with the ball stop 128. In the end, combined with the tapered sidewall (114) of the housing's flow passage (111) the angled rails 126 and open flutes 126' can help to improve flow through the valve by producing a helical flow pattern and producing a pressure drop.

As noted above and as shown in FIG. 4A, the tapered surfaces 124 on the end of the insert 120 are defined at an angle ($\beta$) to locate in the housing (110) against the tapered sidewall (114). The angle ($\beta$) preferably does not approach being orthogonal to the longitudinal axis (A). As an example, the angle ($\beta$) can be about at least less than 45-degrees and can preferably be about 15-degrees. For the reasons discussed below, the angle ($\beta$) of the tapered surface 124 combined with the housing's tapered sidewall (114) can help with further securement of the insert 120 in the housing's flow passage (111). Likewise, the tapered sidewall (112) of the housing's flow passage (111) is comparably angled with the angle ($\beta$) and can provide the improved flow path already noted.

Figure 4B:
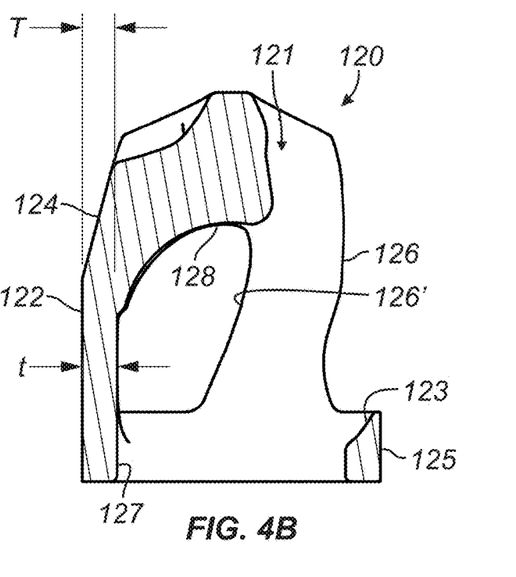
Figure 4C:
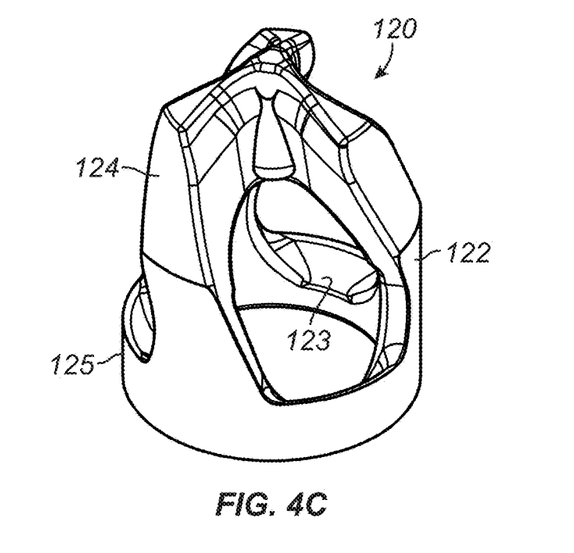
Figure 4D:
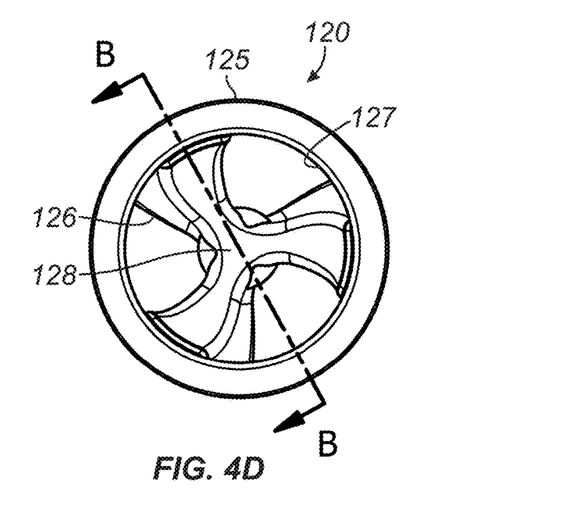

Preferably and as shown in FIG. 4A, the tapered surface 124 accounts for about half of the suited linear area along the longitudinal extent of the insert 120. In fact, the tapered surface 124 makes up an extent ($l_1$) of the rails 126 that is longer than a remaining extent ($l_2$) the longitudinal surface 122 of the rails 126 extending up from the insert's ring portion 125. As best shown in FIG. 4B, a projected extent (T) of the tapered surface 124 is greater than a thickness (t) of the rails 126.

All in all, about half of the upper extent of the insert 120 includes the taper from the tapered surface 124. This allows the taper of the sidewall (114) in the flow passage (111) to produce less turbulent flow. Additionally, the tapered engagement between the tapered surface 124 and tapered sidewall (114) allows the insert 120 to fit securely in the housing's flow passage (111) in a way not possible using an orthogonal or shallow shoulder.

To further improve flow, the cross-section of the ribs 126 can vary from top to bottom of the insert 120 and from inside to outside the insert 120. For example, the width of the ribs 120 can be thinned at top near the ball stop 128; the thickness (t) of the ribs 120 can increase toward the top of the insert 120 near the ball stop 128. The profile of the ribs 126 can be triangular, being narrower toward the center of the flow passage 121 and being wider toward the outer perimeter of the insert 120. A step can be present in the transition from the rib 126 to the ball stop 128 to provide greater annular ball clearance, allowing solids from the well fluid to pass freely and not impede the ball movement while permitting the ball stop 128 to engage more of the circumference of the ball (130) when seated. The ribs 126 terminating at the center of the flow passage 121 to form the ball stop 128 can taper in width toward their terminal ends that meet at the center so that more area of the flow passage 121 is opened.

In addition to the above, the ball passage 127 forms of flow entrance for the flow passage 121 that is concentric to, but greater, than the ball's diameter. A flared transition 123 from the ball passage 127 to the flutes 126' can be provided on the ring portion 125 to further improve the flow coefficient through the insert 120. Clearances of the ball passage 127 can be increased to allow possible solids to pass.

Figure 5:
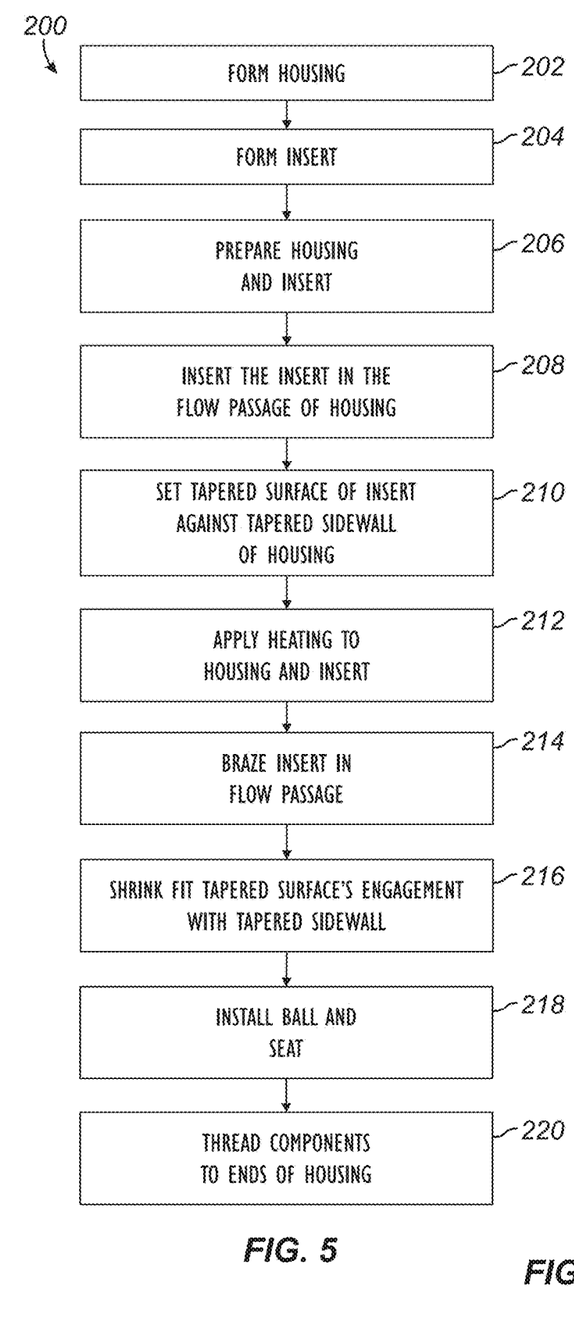
FIG. 5 illustrates a process of manufacturing a valve assembly of the present disclosure.
Figure 6:
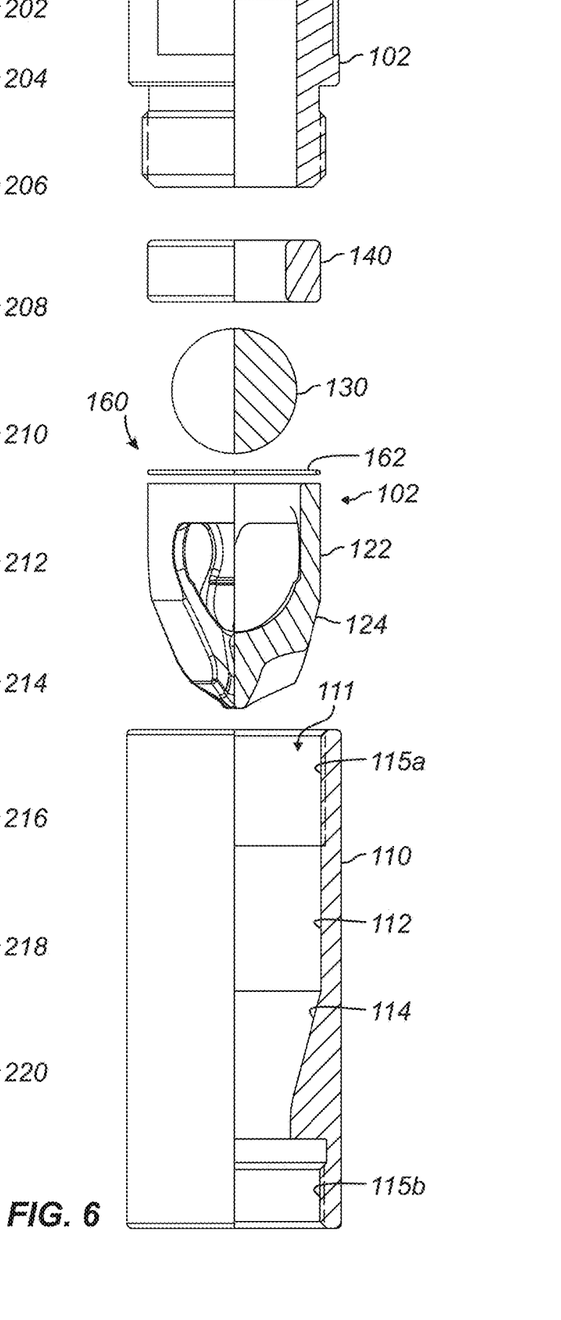
FIG. 6 illustrates components for the manufacture of the valve assembly.

Having an understanding of the valve assembly 100 and its components, discussion now turns to steps for manufacturing the valve assembly 100. In particular, FIG. 5 illustrates a process 200 of manufacturing the valve assembly 100 of the present disclosure. (For understanding, reference will be made to components of the various configurations of the valve assembly 100, such as those shown in FIG. 6.) In this process 200, a metallurgical securement 160 using a brazing material is described to secure the insert 120 in the housing's flow passage 111. As will be appreciated, various steps of the process 200 can be adapted to other structures (150) disclosed herein for sealing and/or securement.

In the manufacture, the housing 110 and the insert 120 are formed (Blocks 202, 204). In particular, the housing 110 is machined to have the flow passage 111 with the longitudinal sidewall 112, the tapered sidewall 114, and any other features. The threads are formed on the ends 115a-b.

For its part, the insert 120 may be machined or may be cast from a suitable material, such as a STELLITE® material. The insert 120 is formed for flow through the flow passage 121 and to have a ball stop 128, a ball passage 125, axial rails 126, flutes 126', and the like as disclosed herein. If the insert 120 is made of a material other than a STELLITE® material or the like, various surfaces can be treated with hardened material in a welding process.

In preparation of assembly (Block 206), the housing 110 and the insert 120 are cleaned. For the brazing to be performed, flux is applied to surfaces as needed. (Soldering may also use flux.)

For assembly, the insert 120 is inserted in the flow passage 112 of the housing (Block 208), and the tapered surface 124 of the insert 120 is set against the tapered sidewall 114 of the housing 110 (Block 210). Preferably, the housing 110 and insert 120 are inverted from the position used downhole so that gravity can assist the assembly process.

The insert 120 is then secured in the housing 110 using brazing. In these steps, a charge 162 of the brazing material for the securement 160 may be added to the end of the insert 120, or the charge 162 may have already been disposed in any circumferential groove on the insert 120 before insertion into the flow passage 111.

During brazing, heating is applied to the housing 110 and the insert 120 (Block 212). For example, inductive heating can be applied by coils fit externally about the housing 110 at the location(s) of the charge(s) 162. The process 200 now metallurgically affixes the brazing material of the securement 160 between the housing's longitudinal sidewall 112 and at least a portion of the insert's longitudinal surface 122 (Block 214).

Heat from the brazing operation can cause the insert 120 to drop slightly into tapered sidewall 114 of the flow passage 111 due to thermal expansion of the housing 110. Once the components are cooled, the insert 120 can then be held rigid. During the heating process, for example, the applied heat increases the engagement of the tapered surface 124 of the insert 120 against the tapered sidewall 114 of the flow passage 111 due to thermal expansion of the components followed by subsequent cooling. The tapered surface 124 on the upper end of the insert 120 allows the insert 120 to drop further into the housing's flow passage 111 due to thermal expansion during the induction brazing cycle. When the assembly cools, the matching tapered sidewall 114 in the housing 110 contracts around the insert 120, and the longitudinal surface 122 of the insert's ring structure 125 is brazed and sealed to the longitudinal sidewall 112 without shouldering against an interrupting surface in the housing's flow passage 111. The housing's tapered sidewall 114 can thus be shrunk fit against the tapered surface 124 by thermal compression from the subsequent cooling of the components (Block 216). This results in a very rigid assembly.

To complete the assembly at any time after the manufacture, the ball 130 can be disposed in the housing's flow passage 111 and in the insert 120 (Block 280) so that the ball 130 will be engageable with the ball stop 128 and passable through the ball passage 127. The ball seat 140 is then positioned in the flow passage 111 adjacent the ball passage 127 of the insert 120 (Block 280). The additional components, such as adapter 102, are then threaded to the ends 115a-b of the housing 110, and the assembly 100 can be added to other components of a downhole pump, such as a plunger body or a barrel body.

In the securing step 212-214 disclosed above, the insert 120 is secured to the housing 110 by means of brazing. This process can ensure that the insert 120 is sealed as well as permanently secured to the housing 110. The complete housing 110 is machined prior to placing and brazing the insert 120 therein. This form of assembly translates into shorter lead times and lower manufacturing costs. Depending on the materials used, several factors are configured for performing this process, such as the brazing material composition, the orientation of the insert 120 (parallelism and flatness between the insert's body axis is desired), flux type, amount of brazing material used (there needs to be a certain shear load carried by the brazed joint), and the brazing method.

Figure 7A:
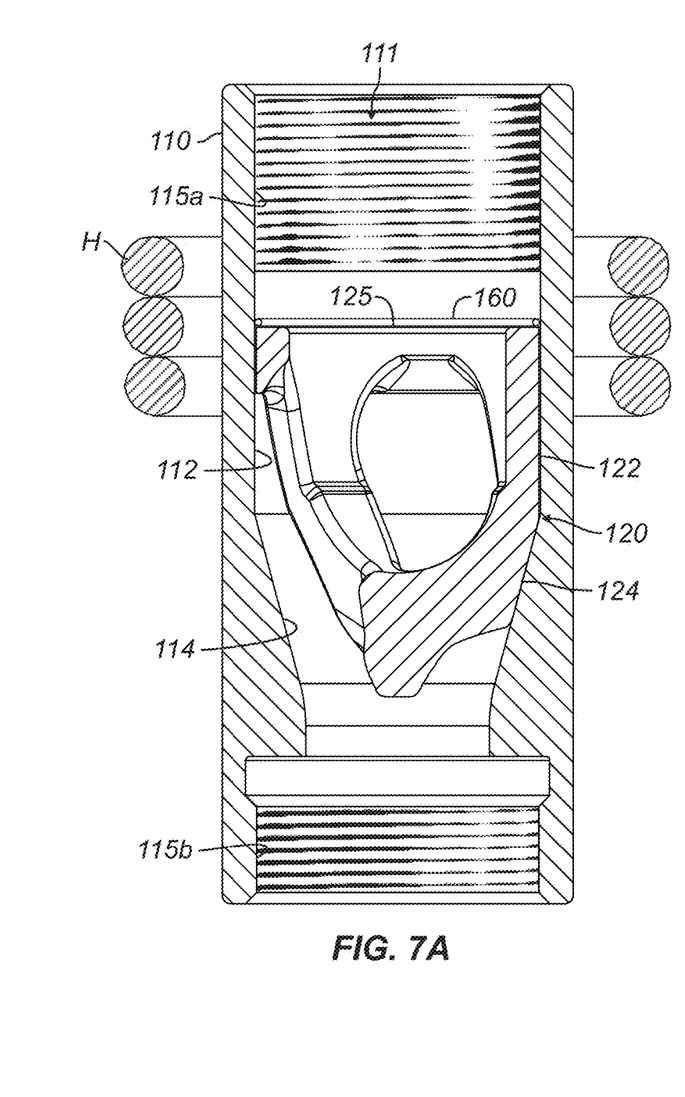
FIGS. 7A-7B illustrate cross-sectional views of valve components during a stage of manufacture.
Figure 7B:
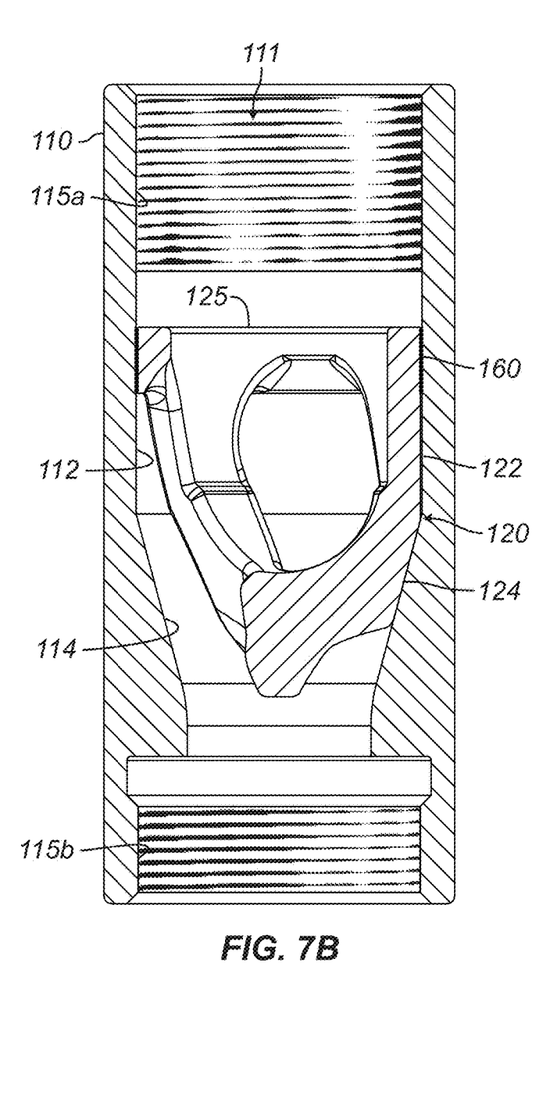

To illustrate the securement process, FIGS. 7A-7B illustrate cross-sectional views of valve components during a stage of manufacture of the valve assembly 100 of the present disclosure. Similar reference numbers are used for the same components between configurations.

In the manufacture, the insert 120 installs in the flow passage 111 with the insert's tapered surface 124 engaging the tapered sidewall 114 near the uphole end 115b of the housing 110. Again, the housing 110 may be inverted during manufacture so that gravity assists the insert's engagement with the tapered sidewall 114.

A charge 162 of metallic material is positioned at the end (i.e., a ring portion 125) of the insert 120, and heating is applied to melt the charge 162 to form the metallurgical securement 160 between the end 125 of the insert 120 and the flow passage 111. The heating can be applied by an inducting heating coil H disposed adjacent the housing 110 and the location of the insert's lower end and the charge 162.

As shown specifically here, the charge 162 can be a ring, strip, coil, or the like of a brazing material. For brazing, the heating appliance H can be an inductive coil disposed relative to the housing 110 to heat the components and to melt the charge 162 of the brazing material. In any of these arrangements, the heating appliance H can be disposed about and/or inside the housing 110. In general, the heating can be performed in a number of ways, such as using an inductive coil, an oven, a heating torch, or the like.

Figure 8:
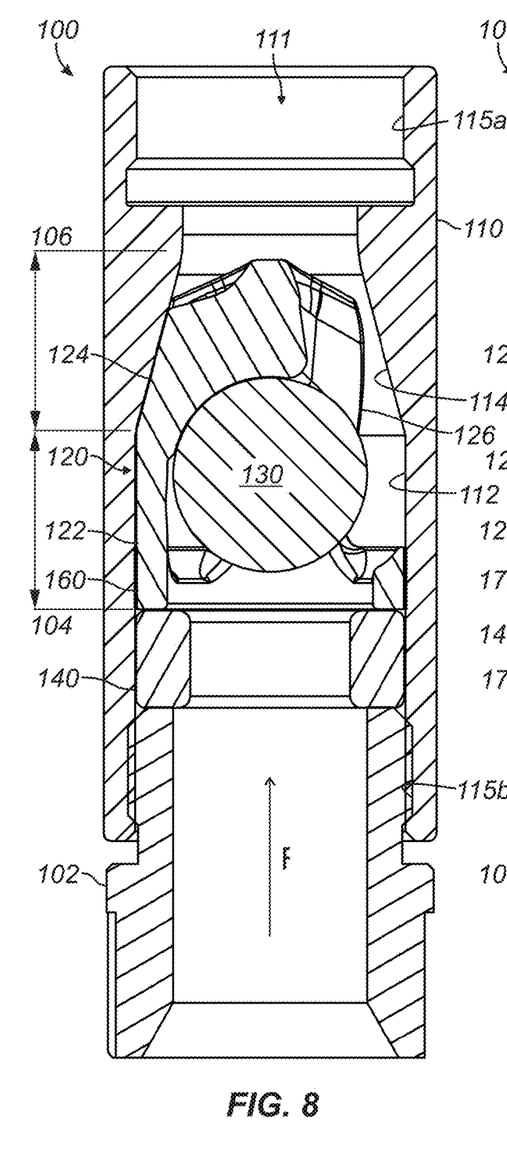
FIG. 8 illustrates a cross-sectional view of the assembled valve assembly.

Once the insert 120 is metallurgically affixed by the securement 160, the configuration of FIG. 7B would then be assembled with other components to form the valve assembly 100, such as shown in FIG. 8, including the ball 130 in the insert 120 and the seat 140 at the insert's lower end 126. An adapter 102 can then be threaded at the housing's downhole end 115a to hold the seat 140 in place. The adapter 140 can include an edge or a shoulder that abuts against the seat 140.

As can be seen in FIG. 8, flow (F) passing through the flow passage 111 encounters a first longitudinal extent 104 through the insert 120 by virtue of the exposed longitudinal sidewall 112 and encounters a second longitudinal extent 106 through the insert 120 by virtue of the exposed tapered sidewall 114. The tapered sidewall 114 of the flow passage 111 accounts for about half the longitudinal extent of the flow (F) through the insert 120. Additionally, the flow (F) passing through the flow passage 111 experiences rotation through a majority of the longitudinal extent of the insert 120 by virtue of the angle of the rails 126. Thus, the modifications to the flow (F) provided by the tapering and angling are intentionally pronounced.

As disclosed herein, a charge 162 of brazing material is used to secure the insert 120 in the housing 110. As shown in FIGS. 9A-9D, the charge 162 of brazing material can be positioned adjacent an annulus between the flow passage 111 and the insert 120, such as against the end of the insert 120, in a beveled edge, in a circumferential slot, or the like. Application of the heating to the housing 110 using an inductive coil adjacent the charge 162 of brazing material then melts the brazing material, which wicks in the annular space and cools to secure and seal.

Figure 9A:
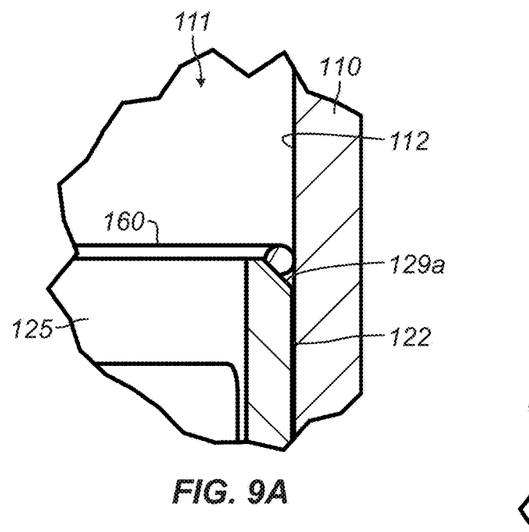
FIGS. 9A-9D illustrate detailed views of different configurations of the valve components during a stage of manufacture.
Figure 9B:
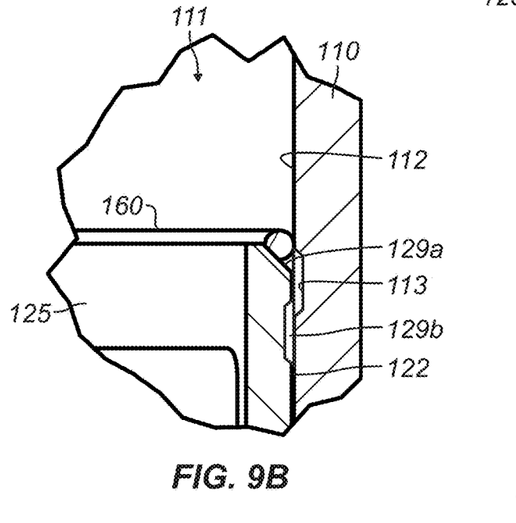

As shown in the detail of FIG. 9A, for example, a beveled edge 129a can be provided on the insert's lower end near the ring portion 125 to facilitate the placement of the charge 162 and wicking of the brazing material between the surface 122 and sidewall 112. As shown in FIG. 9B, an inner annular slot 113 can be defined in the flow passage 111 of the housing 110 and/or an outer annular slot 129b can be defined around the outside of the insert's ring structure 125 to facilitate the placement and wicking of the brazing material of the charge 162.

Figure 9C:
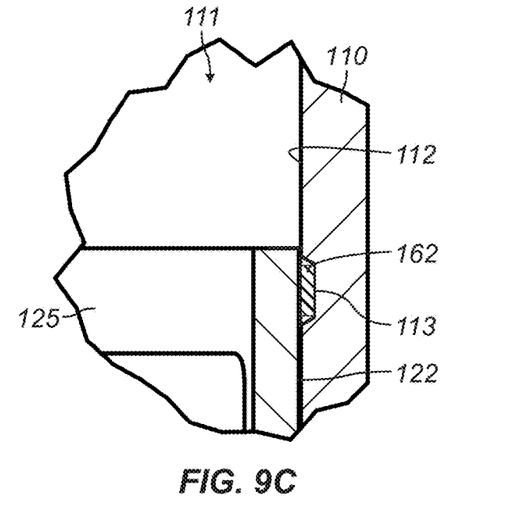
Figure 9D:
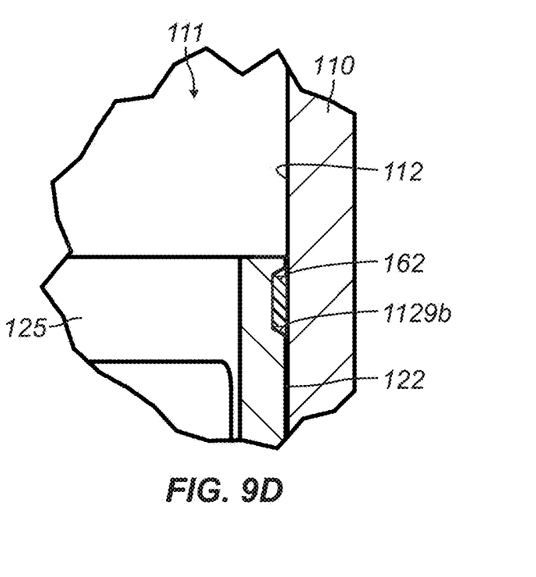
Figure 10A:
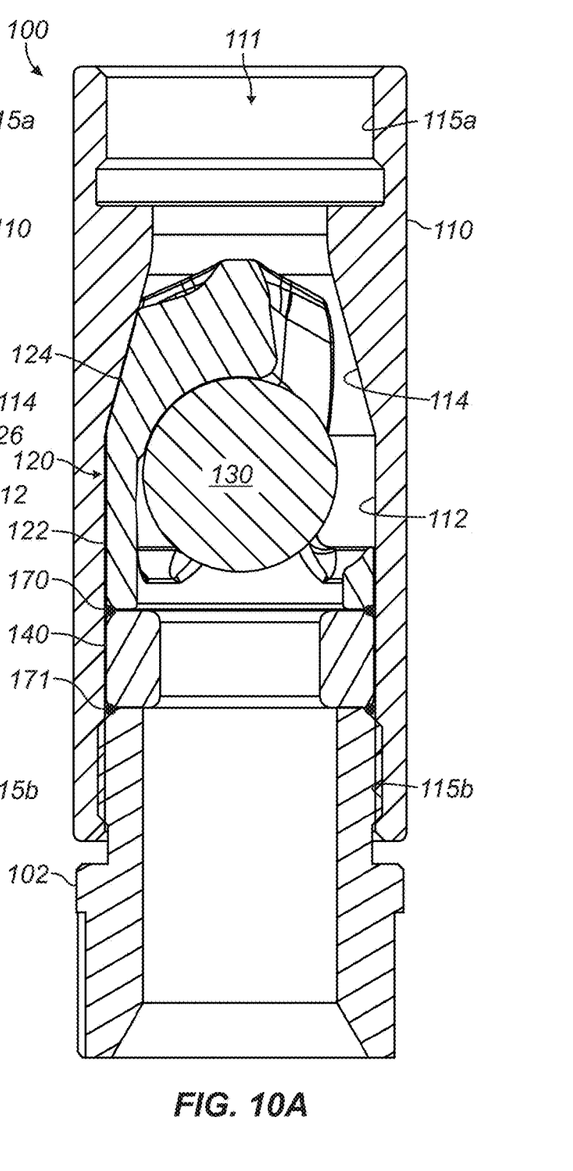
FIGS. 10A-10E illustrate cross-sectional views of other valve assemblies of the present disclosure.
Figure 10B:
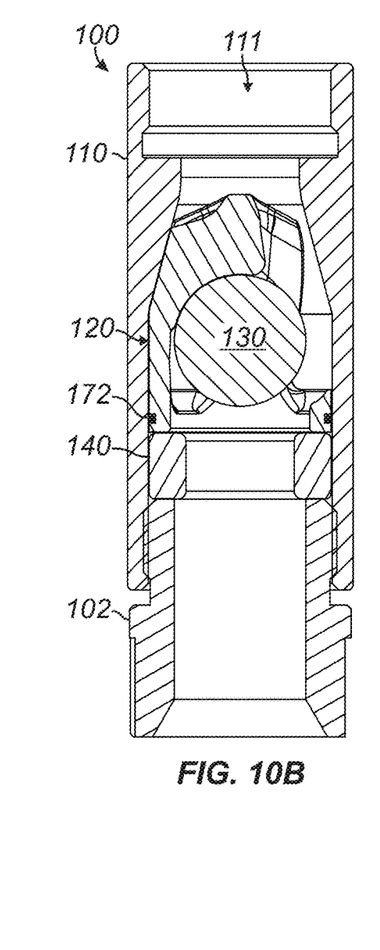
Figure 10C:
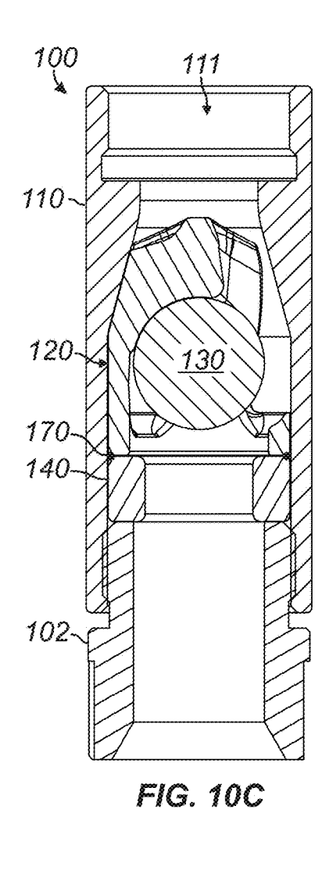
Figure 10D:
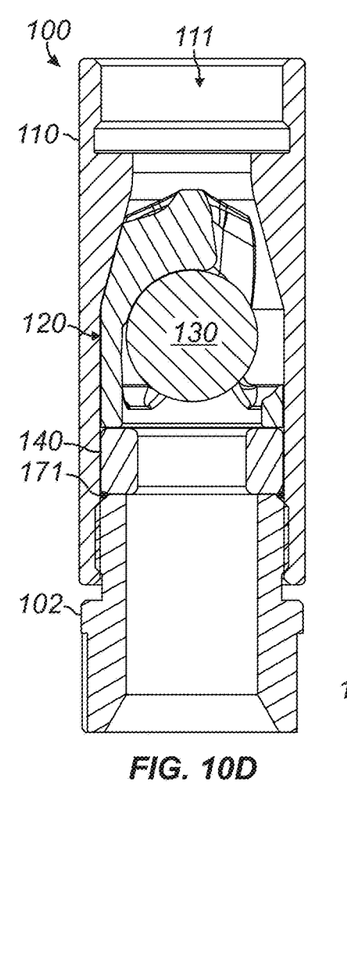
Figure 10E:
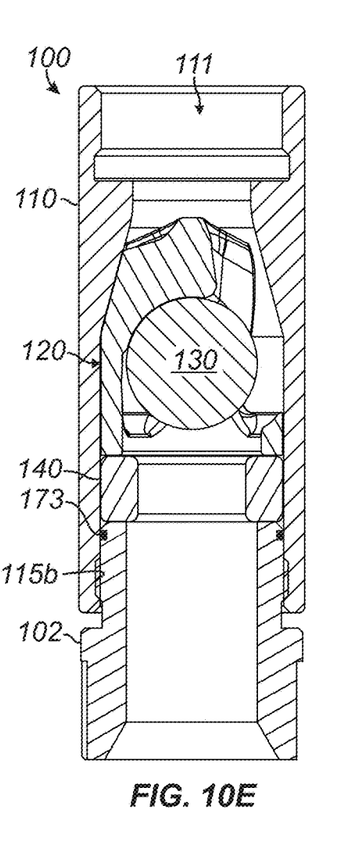

As shown in FIGS. 9C-9D, the charge 162 can be preinstalled in an inner annular slot 113 and/or an outer annular slot 129b to facilitate the placement and wicking of the brazing material. These and other arrangements can be used.

The brazing material used can be any suitable alloy for the application at hand and can be composed of a silver-based braze suited for 300-series stainless steels. For use with a STELLITE® insert 120 and housing 110 of MONEL® material, stainless steel or the like, the brazing material can be a sliver brazing filler metal having various combinations of silver Ag, copper Cu, zinc Zn, cadmium Cd, nickel NI, tin Sn, lithium Li, manganese Mn, and other elements.

A particularly useful brazing material may include by weight percent about 50% Ag±1%, 20% Cu±1%, 28% Zn±2%, and 2% Ni±0.5%. The general chemical composition of the brazing material can include AWS classification of BAg-24 (UNS P07505). Other commercially available brazing materials can be used, such as SILVALOY® 505 manufactured by Lucas-Milhaupt, Inc. or STAY-SILV® 50N manufactured by Harris Products Group. (SILVALOY® is a registered trademark of LUCAS-MILHAUPT WARWICK LLC, and STAY-SILV® is a registered trademark of LINCOLN GLOBAL, INC.)

The flux can be a black brazing flux for use with high silver brazing filler metals. Black flux turns transparent close to the brazing application temperature, which may be in the range of about 1000-1700° F. One useful flux includes STAY-SILV® black paste flux.

As noted above, the metallurgical securement 160 can use a brazing material and a brazing process. In another arrangement, the metallurgical securement 160 can use a soldering material that metallurgically affixes between the insert 120 and the flow passage 111 using a soldering process, which can have similarities to the brazing process. In the soldering process, the heating appliance H can heat the charge 162 of soldering material. The charge 162 of soldering material can be positioned adjacent an annulus between the flow passage 111 and the insert 120, such as against the end of the insert 120, in a beveled edge, in a circumferential slot, or the like. Application of the heating to the housing 110 adjacent the soldering material then melts the soldering material, which wicks in the annular space and cools to secure and seal. Soldering may be suited for lower temperature applications because the solder may have a lower melting point of 500-F or the like. The soldering material used can be any suitable alloy for the application at hand and can be composed of silver and tin. A suitable soldering material would include Stay Brite #8 tin/silver solder, which has a weight percent of 5.5 to 6% silver and a remaining weight percent of tin. ASTM classification for this solder material is B32 Grade Sn95.

As noted further above, apart from or in addition to using a metallurgical securement 160 to both secure and seal the insert 120 in the housing 110, a structure (150; FIGS. 3A-3B) can be used for sealing the insert 120 in the housing 110. One type of structure 150 that can be used is an elastomeric seal. As some brief examples, FIGS. 10A-10E show cross-sectional views of valve assemblies 100 of the present disclosure. Similar reference numbers are used for comparable element in the other disclosed configurations. Here, one or more seals 170, such as elastomeric seals, are used. For example, seals 170, 171 as in FIG. 10A can be used between the end of the insert 120 and the ball seat 140 and between the ball seat 120 and the end of the adapter 102 threaded to the housing 110; a seal 170 in the insert 120 as in FIG. 10B can engage in the flow passage 111; a seal 170 as in FIG. 10C can be used between the end of the insert 120 and the ball seat 140; a seal 171 as in FIG. 10D can be used between the ball seat 120 and the end of the adapter 102 threaded to the housing 110; and/or a seal 173 in the adapter 102 as in FIG. 10E can engage in the flow passage 111. The seals 170, 171, 172, 173 can be used instead of or in addition to any metallurgical securement (160) noted previously. In any event, the seals 170, 171, 172, 173 can help prevent fluid from flowing and washing out the threads on the assembly. These and other configurations are possible.

As noted further above, apart from using a metallurgical securement 160 to secure the insert 120 in the housing 110, the insert 120 of the present disclosure can instead be held captive in the flow passage 111 by engagement of the tapered surface 124 with the tapered sidewall 114 and by abutment between the seat 140 and the distal end of the insert 120. The longitudinal surface 122 and the longitudinal sidewall 112 can float unshouldered. The seat 140 can abut against the end of the insert 120 and can be secured in place by threading of the adapter 102 into the housing 110 to abut the other side of the seat 140. Some axial force may be applied to load the tapered sidewall and surface 114, 124 and hold the insert 120 captive.

Because the metallurgical securement 160 may not be used in such a configuration, heating of the housing 110 with the insert 120 installed therein may not be performed during assembly of the valve 100. In any event, the loaded engagement between the tapered sidewall and surfaces 114, 124 can still provide an interference fit to secure the insert 120 in the flow passage 111. Still, it is possible during the assembly of the valve 100 to heat the housing 110 with the insert 120 installed therein so that the loaded engagement between the tapered sidewall and surfaces 114, 124 can provide a shrink fit to secure the insert 120 in the flow passage 111 even if the metallurgical securement 160 is not used.

In the end, the tapered surface 124 of the insert 120 and the tapered sidewall 114 of the flow passage 111 have a loaded engagement against one another. This loaded engagement includes at least one: an interference fit of the tapered surface 124 against the tapered sidewall 114; a shrink fit of the tapered sidewall 114 against the tapered surface 124; and an axial load of the tapered surface 124 against the tapered sidewall 112. Selective brazing or other metallurgical attachment could also be used between the tapered surface 124 and the tapered sidewall 112.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of assembling a valve assembly of a downhole pump for a reciprocating pump system, the method comprising:

configuring a housing having first and second ends and defining a first flow passage therethrough, the first flow passage defining a longitudinal sidewall transitioned to a tapered sidewall, the longitudinal sidewall disposed between the first and second ends, the tapered sidewall disposed between the longitudinal sidewall and the first end, the tapered sidewall being angled inward from the longitudinal sidewall;

configuring an insert having third and fourth ends and defining a second flow passage allowing for flow therethrough, the second flow passage defining a ball stop toward the third end and defining a ball passage toward the fourth end, an exterior of the insert having a longitudinal surface toward the fourth end transitioned to a tapered surface toward the third end, the tapered surface being angled inward;

inserting the insert in the first flow passage of the housing by exposing a first extent of the longitudinal sidewall to the second flow passage of the insert and engaging a second extent of the tapered surface of the insert against the tapered sidewall of the first flow passage while floating the longitudinal surface of the insert unshouldered adjacent the longitudinal sidewall of the first flow passage, the second extent being greater than the first extent;

securing the insert in the housing to build an assembled arrangement for the valve assembly to retain the insert in the first flow passage by:
(i) applying heat to the assembled arrangement of the housing having the insert inserted therein, and
(ii) brazing a brazing material between a portion of the longitudinal surface of the insert and a portion of the longitudinal sidewall of the first flow passage in response to the applied heat; and further retaining the insert in the first flow passage by increasing the engagement of the tapered surface of the insert against the tapered sidewall of the first flow passage by using thermal expansion of the assembled arrangement from the applied heat, in combination with subjecting the insert in the housing to an axial force, and followed by thermal compression of the tapered sidewall of the housing against the tapered surface of the insert from subsequent cooling of the assembled arrangement.

2. The method of claim 1, wherein configuring the housing comprises forming the housing by machining the first flow passage in the housing to define the longitudinal sidewall and the tapered sidewall between the first and second ends; and machining threads at the first and second ends for threading to other components of the downhole pump.

3. The method of claim 1, further comprising building the valve assembly by:
positioning a ball movably disposed in the first flow passage of the housing of the assembled arrangement, engageable with the ball stop of the insert, and passable at least partially through the ball passage of the insert;
positioning a ball seat in the first flow passage adjacent the fourth end of the insert having the ball passage;
affixing an endpiece to the second end of the housing; and
trapping the ball seat in the housing between the fourth end of the insert and a shoulder of the endpiece.

4. The method of claim 1, wherein brazing with the brazing material comprises initially positioning a charge of the brazing material adjacent an annular space between the insert and the first flow passage.

5. The method of claim 4, wherein initially positioning the charge of the brazing material adjacent the annular space between the insert and the first flow passage comprises positioning the charge of the brazing material in a circumferential slot defined around the insert.

6. The method of claim 1, wherein applying the heat comprises using inductive heating with a coil disposed relative to the housing.

7. The method of claim 1, wherein subjecting the insert in the housing to the axial force comprises inverting the assembled arrangement and using gravity as the axial force to assist the engagement of the tapered surface of the insert against the tapered sidewall of the first flow passage.

8. The method of claim 1, wherein configuring the housing comprises configuring the housing composed of a first material at least subject to the thermal expansion; and wherein configuring the insert comprises configuring the insert composed of a second material being different from the first material and being different from the brazing material.

9. The method of claim 1, wherein configuring the insert comprises configuring the insert having a ring structure toward the fourth end and having rails extending from the ring structure toward the third end, the rails being separated by flutes defined in the insert, the ring structure defining the ball passage, the ball passage and the flutes forming the second flow passage, the rails converging to the ball stop at the third end, the exterior of the ring structure and the rails toward the fourth end having the longitudinal surface transitioned to the tapered surface of each of the rails toward the third end, the tapered surface of each rail being angled inward.

10. The method of claim 9, wherein configuring the insert comprises forming the insert by casting the insert with the ring structure, the rails, the ball stop, and the ball passage.

11. The method of claim 9, wherein exposing the first extent of the longitudinal sidewall to the second flow passage of the insert comprises exposing the first extent of the longitudinal sidewall through the flutes in the insert; and wherein engaging the second extent of the tapered surface of the insert against the tapered sidewall of the first flow passage comprises exposing the second extent of the tapered sidewall through the flutes in the insert.

12. The method of claim 9, wherein configuring the insert comprises configuring the insert to have a total longitudinal extent therethrough from the fourth end to the third end along a longitudinal axis of the insert; and wherein inserting the insert in the first flow passage of the housing comprises exposing a longitudinal extent of the tapered sidewall via the flutes in the insert, the longitudinal extent accounting for at least half of the total longitudinal extent through the insert.

13. The method of claim 9, wherein configuring the insert comprises configuring each of the rails of the insert to be skewed at an angle relative to a longitudinal axis of the insert.

14. The method of claim 9, wherein configuring the insert comprises configuring the ball passage to define a flare from the ball passage to the flutes.

15. A method of assembling a valve assembly of a downhole pump for a reciprocating pump system, the method comprising:
configuring a housing having first and second ends and defining a first flow passage therethrough, the first flow passage defining a longitudinal sidewall transitioned to a tapered sidewall, the longitudinal sidewall disposed between the first and second ends, the tapered sidewall disposed between the longitudinal sidewall and the first end, the tapered sidewall angled inward from the longitudinal sidewall;

configuring an insert having third and fourth ends and defining a second flow passage allowing for flow therethrough, the second flow passage defining a ball stop toward the third end and defining a ball passage toward the fourth end, an exterior of the insert having a longitudinal surface toward the fourth end transitioned to a tapered surface toward the third end, the tapered surface being angled inward;

inserting the insert in the first flow passage of the housing by exposing a first extent of the longitudinal sidewall to the second flow passage of the insert and engaging a second extent of the tapered surface of the insert and the tapered sidewall of the first flow passage with a loaded engagement against one another while floating the longitudinal surface of the insert unshouldered adjacent the longitudinal sidewall of the first flow passage, the second extent being greater than the first extent; and retaining the insert in the first flow passage by:
increasing the loaded engagement of the tapered surface of the insert with the loaded engagement against the tapered sidewall of the first flow passage by shrink fitting the tapered sidewall of the housing against the tapered surface of the insert; and capturing the insert in the housing by positioning a ball seat in the first flow passage of the housing adjacent the fourth end of the insert, affixing an endpiece to the second end of the housing, and abutting the ball seat against the fourth end of the insert.

16. The method of claim 15, wherein increasing the loaded engagement of the tapered surface of the insert against the tapered sidewall of the first flow passage with the loaded engagement against one another further comprises engaging with at least one of:
an interference fit of the tapered surface against the tapered sidewall; and
an axial load of the tapered surface against the tapered sidewall.

17. The method of claim 15, comprising further retaining the insert in the first flow passage by securing a first portion of the longitudinal surface to a second portion of the longitudinal sidewall with a metallurgical securement.

18. The method of claim 17, wherein securing the first portion of the longitudinal surface to the second portion of the longitudinal sidewall with the metallurgical securement comprises:
applying heat to an assembled arrangement of the housing having the insert inserted therein;
brazing a brazing material between a portion of the longitudinal surface of the insert and a portion of the longitudinal sidewall of the first flow passage in response to the applied heat; and increasing the loaded engagement of the tapered surface of the insert against the tapered sidewall of the first flow passage to even further retain the insert in the first flow passage by using thermal expansion of the assembled arrangement from the applied heat, in combination with subjecting the insert in the housing to an axial force, and followed by thermal compression of the tapered sidewall of the housing against the tapered surface of the insert from subsequent cooling of the assembled arrangement.

19. The method of claim 18, wherein brazing with the brazing material comprises:
initially positioning a charge of the brazing material adjacent an annular space between the insert and the first flow passage; or
initially positioning the charge of the brazing material in a circumferential slot defined around the insert.

20. The method of claim 18, wherein applying the heat comprises using inductive heating with a coil disposed relative to the housing.

21. The method of claim 18, wherein configuring the housing comprises configuring the housing composed of a first material at least subject to the thermal expansion; and wherein configuring the insert comprises configuring the insert composed of a second material being different from the first material and being different from the brazing material.

22. The method of claim 17, further comprising sealing between the longitudinal surface and the longitudinal sidewall using the metallurgical securement.

23. The method of claim 15, further comprising sealing between the longitudinal surface and the longitudinal sidewall by brazing a brazing material between the longitudinal surface of the insert and the longitudinal sidewall of the first flow passage.

24. The method of claim 15, further comprising sealing between the longitudinal surface and the longitudinal sidewall by at least one of:
positioning a first seal between the ball seat and the fourth end of the insert;
positioning a second seal between the ball seat and the endpiece;
engaging a third seal between the longitudinal surface and the longitudinal sidewall; and
engaging a fourth seal between the endpiece and the longitudinal sidewall.

25. The method of claim 15, wherein configuring the insert comprises configuring the insert to have a total longitudinal extent therethrough from the fourth end to the third end along a longitudinal axis of the insert; and wherein inserting the insert in the first flow passage of the housing comprises exposing a longitudinal extent of the tapered sidewall via flutes defined in the insert, the longitudinal extent accounting for at least half of the total longitudinal extent through the insert.

* * * * *